Dec. 27, 1927.
J. F. WHITE
1,653,684
AUTOMOBILE RADIATOR ATTACHMENT
Filed March 21, 1924
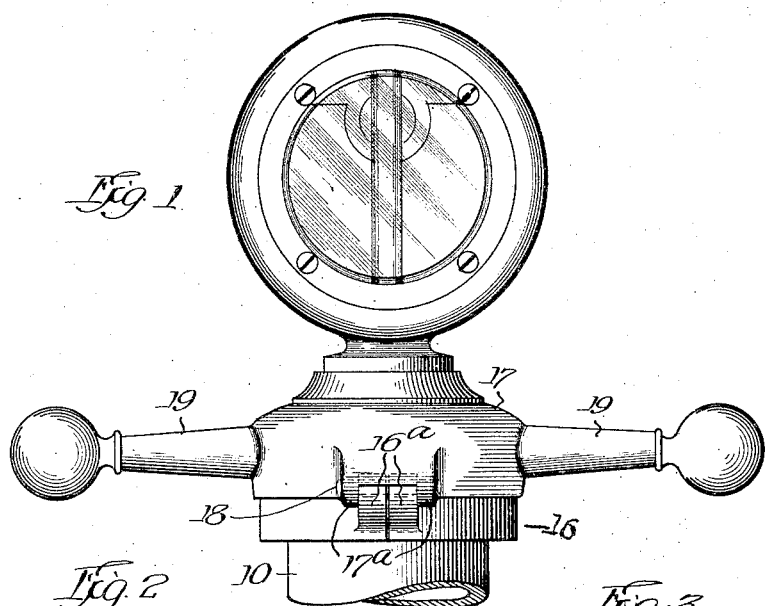
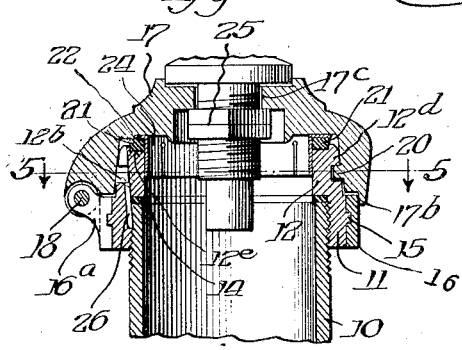
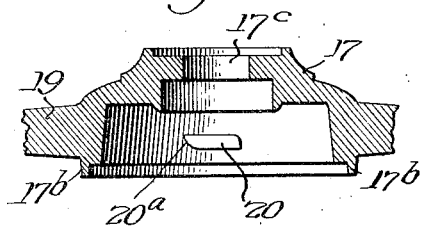
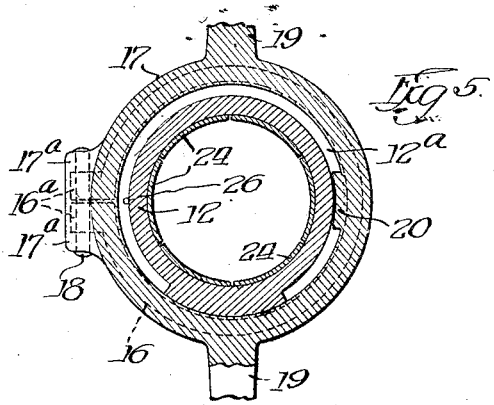
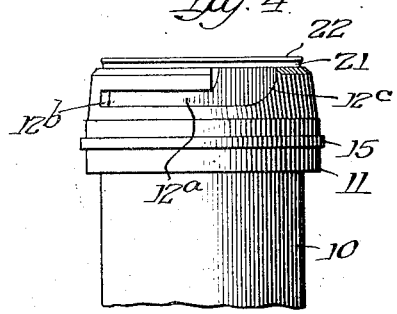
Witness:
Fred C. Larson
Inventor
John F. White
By Cromwell, Greist & Warden
Attys Patented Dec. 27, 1927.

1,653,684

UNITED STATES PATENT OFFICE.

JOHN F. WHITE, OF CHICAGO, ILLINOIS, ASSIGNOR TO WHITE PRODUCTS COMPANY, OF CHICAGO, ILLINOIS, A CORPORATION OF ILLINOIS.

AUTOMOBILE RADIATOR ATTACHMENT.

Application filed March 21, 1924. Serial No. 700,803.

This invention relates to a new article of manufacture designed for use on the filling tubes of automobile radiators and performing the triple office of a closure for the filling tube, an ornament for the vehicle, and a theft-preventing mounting for a temperature indicating device or other attachment.

The general purpose of the invention is the provision of an article of the sort specified which may be manufactured economically in uniform size and pattern, which will present a pleasing, graceful and symmetrical appearance, which will afford secure retention for a motometer or decorative device in proper disposal to exercise its intended function, and which may be operated with the greatest facility to accomplish the opening and closing of the radiator tube.

An important object of the invention is the provision of such a device wherein the securing means are effectively housed and concealed, by virtue of which feature the device presents a smooth and finished exterior, free from crevices which give lodgment for dust, snow and the like, and projections which interfere with the polishing of the device.

Another object is the provision of a device of such construction that it may be applied to automobile radiator tubes of customary form without requiring any special machining or adapting thereof, and without requiring the use of special tools.

Other and further objects of the invention will be pointed out hereinafter, indicated in the appended claims or obvious upon an understanding of the present disclosure.

For the purpose of the present application I have elected to disclose herein what I now regard as a preferred embodiment of the invention, but it is to be understood that the same is presented for illustrative purposes only, and is not to be regarded as limiting what I purport to secure by Letters Patent, short of its true and most comprehensive scope in the art.

In the accompanying drawing forming a part of this specification,

Fig. 1 is a rear elevation of the device showing it assembled with an automobile radiator tube and a temperature indicating device commonly known as a motometer;

Fig. 2 is a sectional elevation taken from front to rear;

Fig. 3 is a detail in the nature of a sectional elevation of the cover, taken transversely;

Fig. 4 is an elevation of the radiator tube with the connection member, and

Fig. 5 is a cross section on the line 5—5 of Fig. 2.

The nature of the invention will be most readily understood by reference to these illustrations in detail. In these it will be understood that the reference character 10 designates the radiator filling tube of an automobile. This is equipped with a connection member, which may be secured thereto in any suitable fashion. If the device is applied to the automobile as standard equipment, this connection member may be formed as an integral part of the radiator tube. Or, if the device is applied to a radiator tube of the present standard construction, the connection member may be attached thereto by means of screw-threads or other suitable means. In the embodiment illustrated this connection member is in the form of a bushing or annulus having the skirt portion 11 and the neck portion 12. The former is provided with a screw-thread, which may be either internal or external, for engagement with the threaded radiator tube, while the neck portion is offset with reference to the screw portion so as to overhang the end of the radiator tube and cooperate therewith to clamp a sealing gasket 14. The neck portion 12 is provided with one or more peripheral bayonet slots $12^a$ open laterally and at the upper margin of the neck portion. At its left-hand end each slot terminates at an abutment $12^b$, while at its right-hand end it has an incline $12^c$. The connection member carries a retaining means 15 which holds the connecting ring 16 against longitudinal movement thereon. This connecting ring 16 is split, as illustrated in Fig. 5, and provided with laterally projecting hinge ears $16^a$ at its abutted ends. It is held contracted upon the skirt portion 11 so that it cannot be removed therefrom but is susceptible of free rotation thereon in either direction. This connecting ring forms a mounting for the cover 17, which is apertured to receive within it the neck portion 12. It is provided also with the pintle seats 17ª, which receive between them the ears 16ª and retain the pintle 18 which traverses said ears and which is permanently connected in place to form a hinge connection between the cover and the ring.

I find it desirable, for neatness in appearance, to have the cover overlap the upper portion of the connecting ring 16, as by the depending margin 17$^b$. The cover is provided with the laterally extending handles 19, preferably symmetrically arranged, whereby the connected cover 17 and ring 16 may be rotated on the connection member, said handles affording also operative means whereby the cover may be swung on the pintle 18. Projecting inwardly in its apertured portion, the cover is provided with a securing lug 20, which preferably is disposed on the side opposite the pintle seats 17ª. This securing lug is of proper proportions to enter any one of the bayonet slots 12ª at the top, and to travel in the circumferentially extended portion thereof beneath the overhanging retaining shoulder 12$^d$ and to make contact with the abutment 12$^b$. At its lower right-hand end the retaining lug is preferably beveled, as at 20ª, on a radius corresponding to the incline 12$^c$ of the bayonet slot. The circumferential extent of the bayonet slot is preferably such as to afford the cover portion considerable latitude of rotary adjustment on the connection member while the securing lug 20 is retained below the shoulder 12$^d$. The upper margin of the neck portion 12 is countersunk, as at 12$^e$, to provide an annular seat for a compression gasket 21, which fits tightly therein and holds a collar-like member having the wear ring 22 overlying the washer 21, and the resilient flange portion 24, which fits slidably within the bore of the neck portion 12, and cooperates with the washer to prevent its displacement from its seat. The wear ring 22 is arranged to make surface contact with the inner surface of the cover 17 when the latter is closed down upon the connection member, so that compression may be exerted upon the washer 21 when the cover is moved to closed position. The portion 24 has sliding movement on the connection member, so that the elasticity of the gasket 21 maintains sealing engagement between the ring 22 and the cover 17. The cover is provided with the axial opening 17$^c$, arranged to accommodate the stem or connecting post of a motometer, or other indicating or ornamental attachment, which is secured in place by securing means 25, which is of such nature as to provide a connection that is either permanent or removable only with great difficulty.

In the event the device is intended for attachment to a radiator tube of standard construction, being fitted with a connection member of proper sort to be mounted on the tube, the cover portion is swung to closed position upon the connection member, so that the securing lug 20 enters the bayonet slot and is moved into abutment with the end 12$^b$ thereof. This retains the connection member for rotation with the cover in clockwise direction, so that the former may be screwed down upon the radiator tube, through operation of the device by means of the handles 19. The gasket 14, which is preferably of a permanent, compressible material, such as lead, affords the proper seal between the connection member and the tube and serves also to bind them together. In the event further security of connection is desired, a pin 26 may be driven across the threads of the tube through a channel in the connection member. Such mounting of the connection member upon the radiator tube affords a permanent anchorage for the device. The cover and ring 16 may be rotated on the connection member in counter-clockwise direction, but any such manipulation of the cover member will not unscrew the connection member, as the securing lug 20 will travel in the bayonet slot and up the incline 12$^c$ until disengaged from the connection member, whereupon the cover may be rotated in either direction upon the latter. This counter-clockwise rotation of the cover member thus is effective to swing the cover on its hinge toward open position, and it may be easily swung to fully open position, giving free access to the interior of the radiator tube through the central bore of the connecting member.

In the original connection of the device to the radiator tube, due care will be taken to see that the top opening of the bayonet slot does not come opposite the cover hinge when the cover is set at the desired rotary adjustment. This can be controlled by the thickness of the washer 14. The purpose of having more than one bayonet slot is simply to afford greater selectivity. When secured in closed position, the cover portion is retained against rotation from the ordinary vibrations of the automobile, by virtue of the friction of the wear ring 22, which is maintained by the pressure from the elastic gasket 21. This gasket is not subjected to wear incident to rotation of the cover, as it is protected by the ring 22. If it becomes devitalized, however, it may be easily replaced by removal of the retaining collar.

In the commercial production of these devices the cover portions and connecting rings may be of uniform size and type, the necessary adaptation to various radiator tubes being accommodated by the proper variations in the threading of the connection members. The assembly of the selected connection member with the ring 16 and cover 17 is accomplished very easily, the pin 18 constituting the securing fastening. This device possesses distinct advantages in the fact that the means for holding the cover closed is completely housed where it is not subject to freezing or becoming encumbered with dust, snow or other foreign matter, and where it does not interfere with the polishing of the device. Through the leverage afforded by the handles, considerable force may be exerted upon the swinging cover to compress it upon the wear ring 22 and gasket 21, whereby a close seal is obtained. Moreover, while securely retained in closed condition under ordinary circumstances, the opening operation, when intentional, is very easily performed, due to the positive camming action exerted upon the cover as the lug 20 rides up the incline 12°. In addition to the mechanical advantages obtained by housing the securing means, this construction is of particular advantage because of the fact that it lends itself to neatness and attractiveness in contour and design.

I claim:

1. An attachment for automobile radiators comprising, in combination, a connection member for attachment to the radiator nipple, an annular member secured to said connection member for rotary movement thereon in either direction, a cover having hinged connection with said annular member, and means for securing the cover to the connection member for rotation together in one direction.

2. An attachment for automobile radiators comprising, in combination, a connection member for attachment to the radiator nipple, a connecting ring mounted thereon for rotation in either direction, a cover hinged to the connecting ring, means for securing the cover to the connection member, and means for disengaging the cover from the connection member upon rotation of the former in one direction.

3. An attachment for automobile radiators comprising, in combination, a connection member for attachment to the radiator nipple, an annular connecting member secured thereto for rotation in either direction, a cover hinged to the connecting member and rotatable therewith, means for connecting the cover to the connection member upon rotation in one direction, and means for disconnecting the cover from the connection member upon its rotation in the opposite direction.

4. An attachment for automobile radiators comprising, in combination, an annular connection member, a connecting ring encompassing the same and secured thereon for rotary movement in either direction, a cover hinged on the connecting ring and movable to and from position to close the connection member, and members on the cover and connection member to limit their relative rotation in one direction when the cover is in closed position.

5. An attachment for automobile radiators comprising, in combination, a tubular connection member, a connecting ring secured thereon for rotation in either direction, a cover hinged to the ring for movement to and from position closing the connection member, and means on the cover and connection member cooperating to induce hinge movement of the cover upon rotary movement thereof on the connection member.

6. An automobile radiator attachment comprising, in combination, a tubular connection member, a connecting ring mounted for rotary movement thereon, a cover hinged on the ring and adapted to be swung to and from a position closing the connection member, handles whereby the cover may be rotated and means on the cover and the connection member cooperating to swing the cover upon rotary movement thereof.

7. An automobile radiator attachment comprising, in combination, a tubular bushing threaded for connection to the radiator nipple, a connecting ring mounted concentrically thereon for rotation in either direction, a cover hinged to the ring and arranged to close the end of the bushing, said cover being engageable with the bushing for such rotation together in a direction to seat the threaded bushing, and means on the bushing and cover engageable upon their relative rotation to hold the cover in closed position, said members being disengageable by relative rotation of the cover and bushing.

8. An attachment for automobile radiators comprising an annular connection member adapted for attachment to the radiator nipple, a connecting ring rotatably secured to same, a cover hinged to the ring and arranged to form a closure for the connection member, and means for securing the cover to the connection member to prevent its movement to open position.

9. An attachment for automobile radiators comprising, in combination, an annular connection member adapted for attachment to the radiator nipple, an annular connecting member rotatably mounted thereon, a cover hinged on the connecting member for movement to and from position closing the connection member, and means for securing the cover in closed position independently of the connecting member.

10. An attachment for automobile radiators comprising, in combination, an annular connection member adapted for attachment to the radiator nipple, a connecting ring rotatably mounted thereon, a cover hinged on the ring for movement to and from position closing the connection member, and means for securing the cover to the connection member independently of the ring.

11. An attachment for automobile radiators comprising, in combination, an annular connection member adapted for mounting on the radiator nipple, a connecting ring secured thereto for rotary movement in either direction, a cover hinged on the ring and movable to and from position closing the connection member, and means for retaining the cover in closed position independently of the ring, said means permitting rotary adjustment of the cover upon the connection member.

12. An attachment for automobile radiators comprising, in combination, a bushing adapted for attachment to the radiator nipple, an annular connecting member mounted thereon for rotary movement in either direction, a cover hinged on the annular connecting member and arranged to close the bushing and projections on the cover and bushing arranged for interengagement by relative rotary movement to retain the cover in closed position.

13. An attachment for automobile radiators comprising in combination, a bushing screw threaded for connection with the radiator nipple, a cap permanently connected with the bushing and having rotary and swinging movement relative thereto, and cooperative securing members on the cap and bushing engageable by rotary movement of the cap relative to the bushing to secure the cap in closed position.

14. An attachment for automobile radiators comprising, in combination, a bushing screw threaded for connection with the radiator nipple, a cap permanently connected with the bushing and having rotary and swinging movement relative thereto, a circumferentially extending retaining ledge on the bushing, and a securing lug on the cap movable into retentive engagement with the retaining ledge by rotary movement of the cap relative to the bushing, to secure the cap in closed position.

15. A device of the sort described comprising in combination, a connecting bushing for attachment to the radiator nipple, a swinging cap for closing the end of the bushing, a hinge member connecting the cap and bushing and arranged for unlimited revolution on the latter in either circumferential direction, cooperating members on the cap and bushing for holding the former in closed position, and a radially extending handle on the cap for rotating it on the bushing.

In testimony whereof I have hereunto signed my name.

JOHN F. WHITE.